United States Patent
Buijs

(10) Patent No.: US 11,022,754 B2
(45) Date of Patent: Jun. 1, 2021

(54) METHODS FOR PROCESSING A TWO ROW MULTI-FIBER FERRULE

(71) Applicant: COMMSCOPE ASIA HOLDINGS B.V., Bussum (NL)

(72) Inventor: Marcellus P J Buijs, Ede (NL)

(73) Assignee: CommScope Asia Holdings B.V., Bussum (NL)

( * ) Notice: Subject to any disclaimer, the term of this patent is extended or adjusted under 35 U.S.C. 154(b) by 528 days.

(21) Appl. No.: 15/777,623

(22) PCT Filed: Nov. 16, 2016

(86) PCT No.: PCT/EP2016/077908
§ 371 (c)(1),
(2) Date: May 18, 2018

(87) PCT Pub. No.: WO2017/085150
PCT Pub. Date: May 26, 2017

(65) Prior Publication Data
US 2020/0301073 A1    Sep. 24, 2020

Related U.S. Application Data

(60) Provisional application No. 62/257,096, filed on Nov. 18, 2015.

(51) Int. Cl.
*G02B 6/25* (2006.01)
*G02B 6/38* (2006.01)

(52) U.S. Cl.
CPC .............. *G02B 6/25* (2013.01); *G02B 6/3885* (2013.01)

(58) Field of Classification Search
CPC ........ G02B 6/245; G02B 6/25; G02B 6/2555; G02B 6/32; G02B 6/3809; G02B 6/3825; G02B 6/3885; B23K 26/00
(Continued)

(56) References Cited

U.S. PATENT DOCUMENTS 5,214,730 A    5/1993   Nagasawa et al.
6,957,920 B2   10/2005  Luther et al.
(Continued)

FOREIGN PATENT DOCUMENTS

CN   1685259 A     10/2005
CN   102460256 A   5/2012
(Continued)

OTHER PUBLICATIONS

Chinese Office Action for Chinese Patent Application No. 201680067112.6 dated Jul. 2, 2019, 17 pages; English translation.
(Continued)

*Primary Examiner* — Michael P Mooney
(74) *Attorney, Agent, or Firm* — Merchant & Gould P.C.

(57) ABSTRACT

The present disclosure generally relates to a method for processing optical fibers supported by a multi-fiber ferrule. The method can include laser cutting first and second rows of optical fibers in a first fiber cutting step by directing a laser beam in a first direction relative to the ferrule. The laser beam can cut the second row of optical fibers to a first fiber extension length and cut the first row of optical fibers to a second fiber extension length. The method can also include laser cutting the first row of optical fibers by directing a laser beam in a second direction relative to the multi-fiber ferrule. The laser beam cuts the first row of optical fibers to the first fiber extension length and by-passes the second row of optical fibers such that optical fibers of the second row of optical fibers remain at the first fiber extension length.

23 Claims, 6 Drawing Sheets

(58) Field of Classification Search
USPC ...................................... 385/74–87, 134–139
See application file for complete search history.

(56) References Cited

U.S. PATENT DOCUMENTS

2011/0198324 A1* 8/2011 de Jong ................ G02B 6/245
   219/121.72
2015/0309266 A1   10/2015 Childers et al.

FOREIGN PATENT DOCUMENTS

| CN | 102725667 A | 10/2012 |
| CN | 103562767 A | 2/2014 |
| EP | 0 987 570 A1 | 3/2000 |
| EP | 2 884 319 A1 | 6/2015 |

OTHER PUBLICATIONS

International Search Report and Written Opinion of the International Searching Authority for corresponding International Patent Application No. PCT/EP2016/077908 dated Oct. 18, 2017, 11 pages.

* cited by examiner

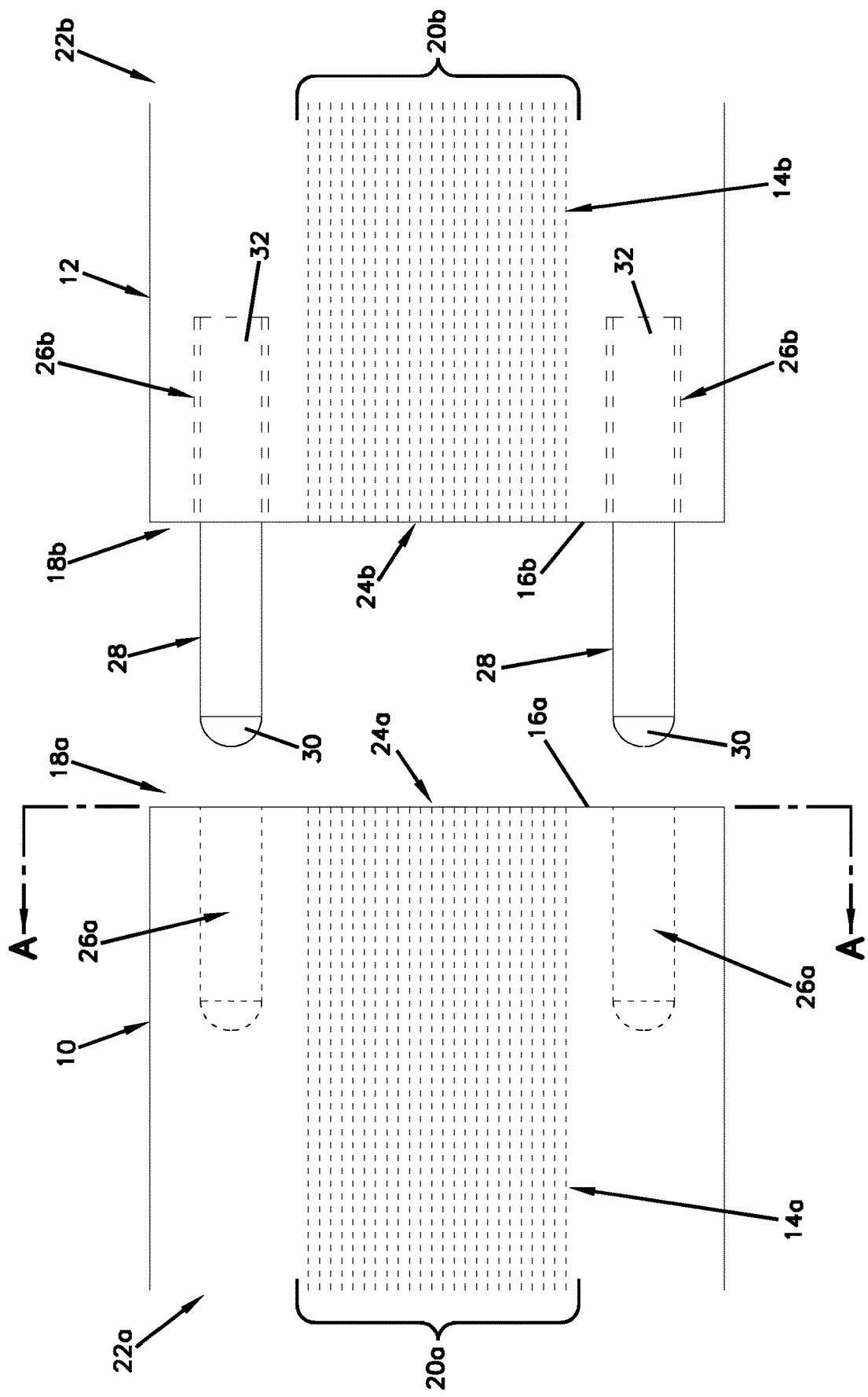

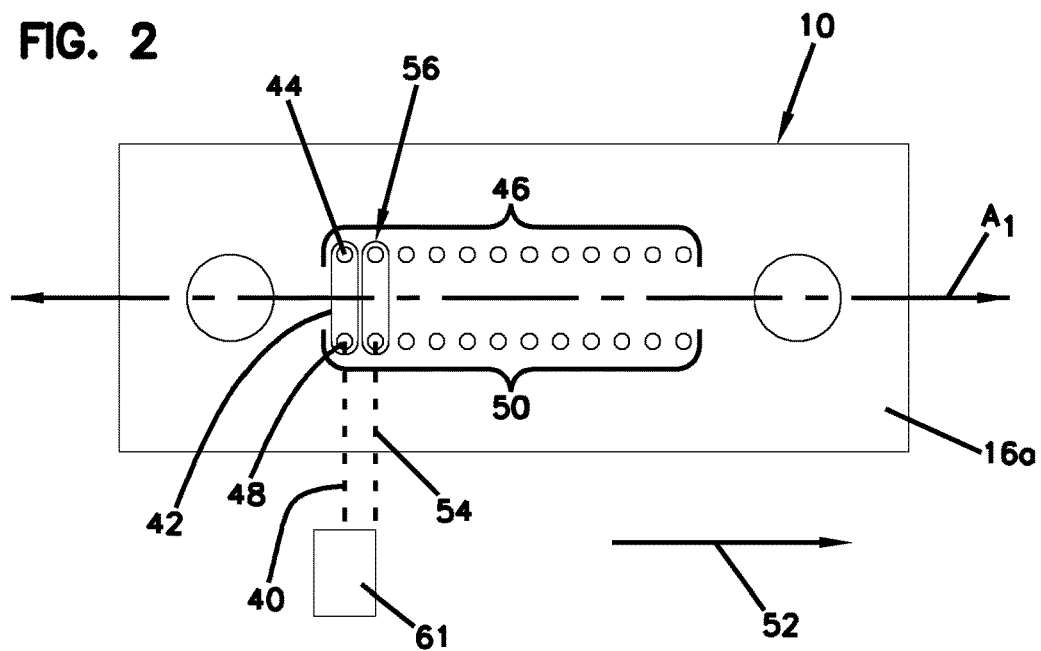
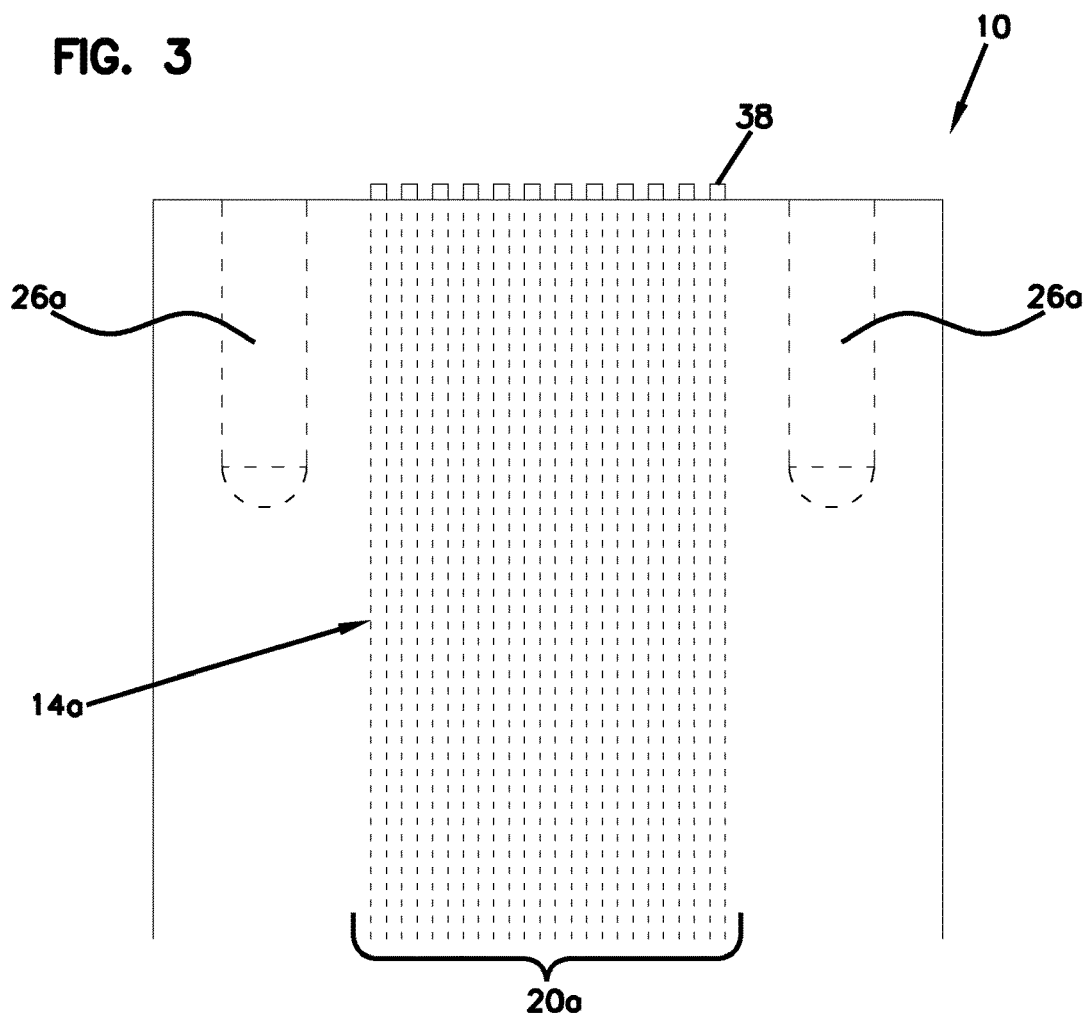

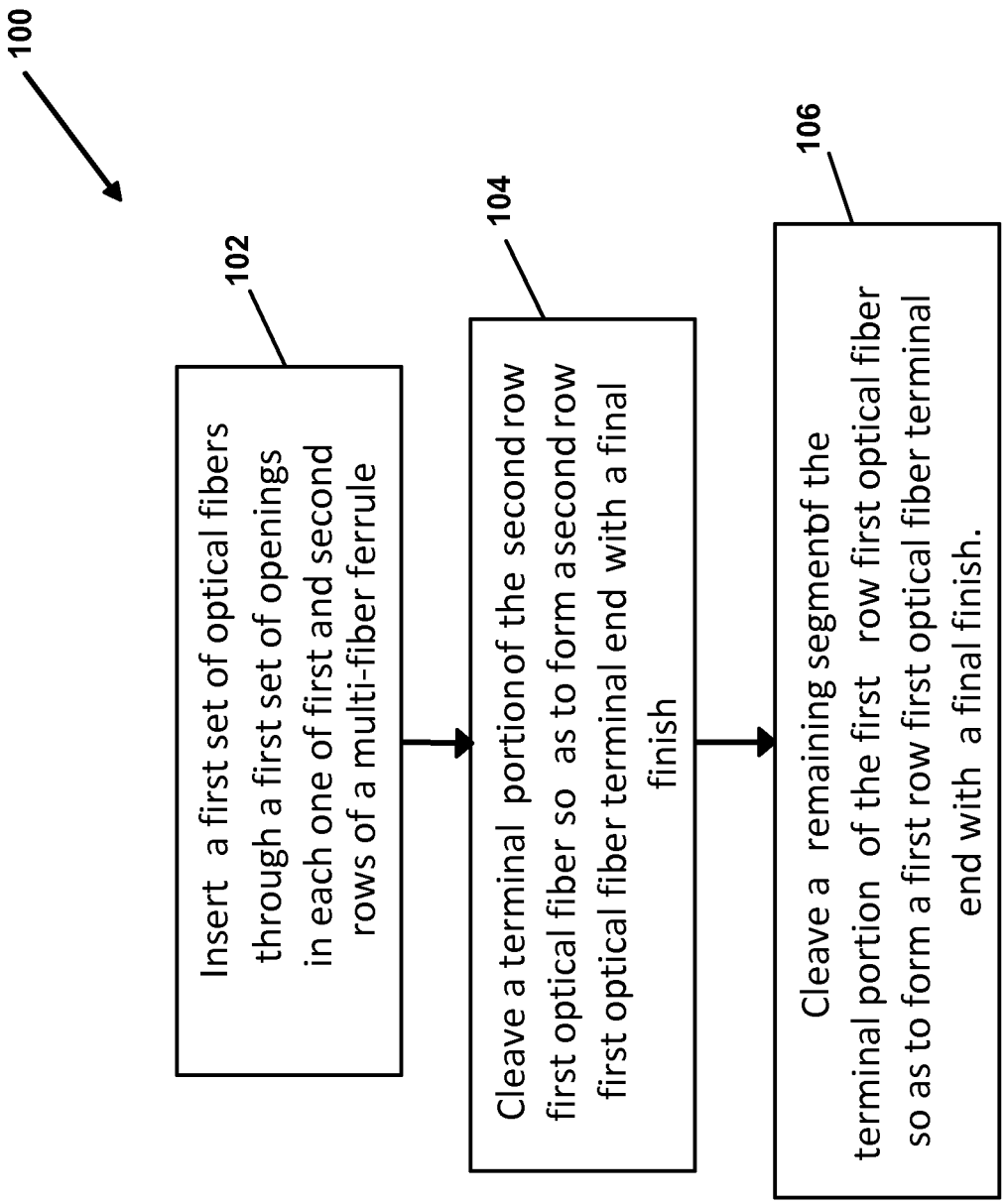

METHODS FOR PROCESSING A TWO ROW MULTI-FIBER FERRULE

CROSS-REFERENCE TO RELATED APPLICATION

This application is a National Stage Application of PCT/EP2016/077908, filed on Nov. 16, 2016, which claims the benefit of U.S. Patent Application Ser. No. 62/257,096, filed on November 18, the disclosures of which are incorporated herein by reference in their entireties. To the extent appropriate, a claim of priority is made to each of the above disclosed applications.

TECHNICAL FIELD

The present disclosure relates generally to methods for processing components of fiber optic connectors. More particularly, the present disclosure relates to methods for processing multi-fiber ferrules used in multi-fiber fiber optic connectors.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Fiber optic connectors are an important part of most fiber optic communication systems. Fiber optic connectors allow optical fibers to be quickly optically connected without requiring a splice. Fiber optic connectors can include single fiber connectors and multi-fiber connectors.

A typical fiber optic connector includes a ferrule assembly supported at a distal end of a connector housing. The ferrule assembly can include a multi-fiber ferrule mounted in a hub. A spring is used to bias the ferrule assembly in a distal direction relative to the connector housing. The multi-fiber ferrule functions to support the end portions of multiple optical fibers. The multi-fiber ferrule has a distal end face at which polished ends of the optical fibers are located. When two multi-fiber fiber optic connectors are interconnected, the distal end faces of the multi-fiber ferrules oppose and are biased toward one another by their respective springs. With the multi-fiber fiber optic connectors connected, their respective optical fibers are coaxially aligned such that the end faces of the optical fibers directly oppose one another. In this way, optical signals can be transmitted from optical fiber to optical fiber through the aligned end faces of the optical fibers.

As indicated above, multi-fiber ferrules are configured for supporting the ends of multiple optical fibers. Typically, the optical fibers are arranged in one or more rows within the multi-fiber ferrule. When two multi-fiber ferrules are interconnected, the fibers of the rows of optical fibers align with one another. For most multi-fiber ferrules, it is desirable for the optical fibers to protrude distally outwardly from the distal end faces of the multi-fiber ferrules. This type of protrusion can assist in making physical fiber-to-fiber contact when two multi-fiber connectors are mated. U.S. Pat. No. 6,957,920, which is hereby incorporated by reference in its entirety, discloses a multi-fiber ferrule having protruding optical fibers of the type described above.

A typical multi-fiber connector is manufactured using a polishing process that can be time consuming and require the use of relatively expensive consumables. A single row multi-fiber connector can be manufactured by using a conventional laser ablation process. When using the conventional way of laser cleaving for a two row multi-fiber connector, the second row of fibers is often cleaved with less quality than the first row of fibers. Thus, the fiber protrusion in the second row is typically shorter compared to the fiber protrusion in the first row.

Improvements in manufacturing two row or multiples of two rows, multi-fiber optic connectors are desirable.

SUMMARY

The present disclosure generally relates to a method for processing optical fibers supported by a multi-fiber ferrule. The method includes laser cutting first and second rows of optical fibers in a first fiber cutting step by directing a laser beam in a first direction relative to the ferrule. The first direction extending from a first major side of the multi-fiber ferrule toward a second major side of the multi-fiber ferrule such that the laser beam cuts the second row of optical fibers to a first fiber extension length and cuts the first row of optical fibers to a second fiber extension length. The first fiber extension length can be shorter than the second fiber extension length. The first and second fiber extension lengths can be measured with respect to a reference plane of the multi-fiber ferrule. The method also includes the step of laser cutting the first row of optical fibers in a second fiber cutting step after the first fiber cutting step by directing a laser beam in a second direction relative to the multi-fiber ferrule. The second direction extends from the second major side of the multi-fiber ferrule toward the first major side of the multi-fiber ferrule such that the laser beam: a) cuts the first row of optical fibers to the first fiber extension length; and b) by-passes the second row of optical fibers such that optical fibers of the second row of optical fibers remain at the first fiber extension length.

One aspect of the present disclosure relates to a method for cleaving a multi-fiber ferrule having multiple rows. The method can include the step of inserting a first set of optical fibers through a first set of openings in each one of first and second rows of the multi-fiber ferrule so that terminal portions of the first set of optical fibers protrude from the front end of the multi-fiber ferrule. The first set of optical fibers can include a first row first optical fiber positioned in the first row and a second row first optical fiber positioned in the second row. The method also includes the step of cleaving the terminal portion of the second row first optical fiber so as to form a second row first optical fiber terminal end having a final finish. The terminal portion of the first row first optical fiber can be affected so as to form a remaining segment of the terminal portion of the first row first optical fiber. The method further includes cleaving the remaining segment of the terminal portion of the first row first optical fiber so as to form a first row first optical fiber terminal end having a final finish. The remaining segment of the terminal portion of the first row first optical fiber can be longer than the second row first optical fiber terminal end such that cleaving thereof does not damage the final finish of the second row first optical fiber terminal end.

Another aspect of the present disclosure relates to a method for cleaving a multi-fiber ferrule having multiple rows. The method can include the step of inserting a first and second set of optical fibers through a respective first and second set of openings in each one of the first and second rows of the multi-fiber ferrule so that terminal portions of the first and second set of optical fibers protrude from the front end of the multi-fiber ferrule. The first set of optical fibers can include a first row first optical fiber and a second row first optical fiber. The second set of optical fibers can include a first row second optical fiber and a second row second optical fiber. The method can further include the step of cleaving the terminal portion of the second row first optical fiber so as to form a second row first optical fiber terminal end having a final finish. The terminal portion of the first row first optical fiber can be affected so as to form a remaining segment of the terminal portion of the first row first optical fiber. The method can include a step of indexing to the second row second optical fiber so as to cleave the terminal portion of the second row second optical fiber to form a second row second optical fiber terminal end having a final finish. The terminal portion of the first row second optical fiber can be affected so as to form a remaining segment of the terminal portion of the first row second optical fiber. The method can include cleaving the remaining segment of the terminal portion of the first row first optical fiber so as to form a first row first optical fiber terminal end having a final finish. The remaining segment of the terminal portion of the first row first optical fiber can be longer than the second row first optical fiber terminal end such that cleaving thereof does not damage the final finish of the second row first optical fiber terminal end. The method can include another step of indexing to the first row second optical fiber to cleave the remaining segment of the terminal portion of the first row second optical fiber to form a first row second optical fiber terminal end having a final finish. The remaining segment of the terminal portion of the first row second optical fiber can be longer than the second row second optical fiber terminal end such that cleaving thereof does not damage the final finish of the second row second optical fiber terminal end.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 1 is a cross-sectional top view of a pair of multi-fiber optic ferrules in accordance with the principles of the present disclosure.

FIG. 2 is a cross-sectional view of the multi-fiber optic ferrule of FIG. 1, as viewed along sight line A.

FIG. 3 is a side view of the female multi-fiber ferrule shown in FIG. 1.

FIG. 10 is a flow chart illustrating a method of processing optical fibers supported by a multi-fiber ferrule in accordance with the principles of the present disclosure.

DETAILED DESCRIPTION

Figure 5:
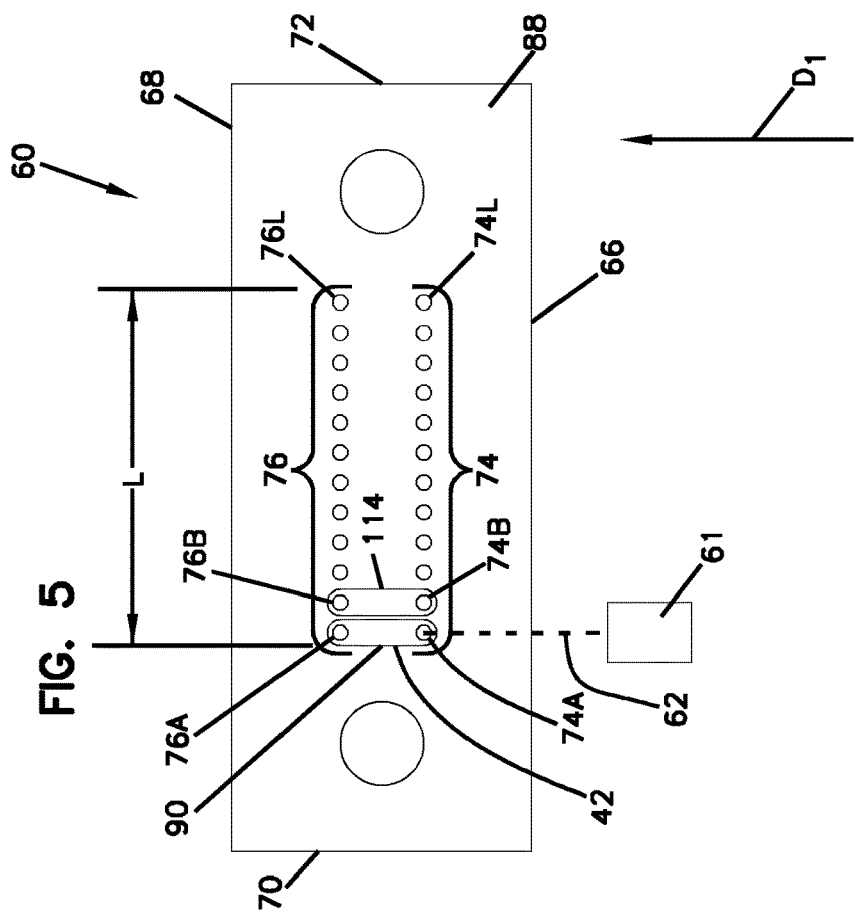
FIG. 5 is an end view of the ferrule of FIG. 4.

The present disclosure relates generally to a manufacturing process for manufacturing multi-fiber ferrules having multiple rows of fibers. The process utilizes laser cleaving to a precision so as to provide end surfaces of the multiple rows of fibers with a final finish. All of the end faces of the multiple rows of fibers are aligned in one plane and have a quality sufficient such that a subsequent polishing step is not needed for certain applications. In other examples, one or more polishing operations may be used after cleaving.

Fiber optic connectors can include ferrules supporting multiple optical fibers (i.e., multiple-fiber ferrules corresponding to multiple-fiber connectors). An example of a multi-fiber connection system is disclosed at U.S. Pat. No. 5,214,730, the disclosure of which is hereby incorporated herein by reference in its entirety.

FIG. 1 illustrates an example female ferrule 10 and a male ferrule 12 adapted to be coupled together. When the ferrules 10, 12 are coupled together (i.e., mated) optical fibers supported by the female ferrule 10 are optically coupled to corresponding optical fibers supported by the male ferrule 12.

In some aspects, the female ferrule 10 and the male ferrule 12 each may include a contact face 16a, 16b at a front end 18a, 18b of the ferrules 10, 12. In some implementations, the female ferrule 10 and the male ferrule 12 (i.e., ferrule body) may each define fiber passages 20a, 20b (e.g., set of openings) that extend through a depth of the female and male ferrules 10, 12 from a rear end 22a, 22b of the female and male ferrules 10, 12 to the front end 18a, 18b of the female and male ferrules 10, 12.

Referring to FIG. 2, the fiber passages 20a of the female ferrule 10 are shown aligned in multiple parallel rows that extend along a major axis $A_1$ of the contact face 16a. The male ferrule 12 can be configured similarly with multiple parallel rows. The female ferrule 10 and the male ferrule 12 each may include a plurality of optical fibers 14a, 14b that extend through each respective rows of the fiber passages 20a, 20b. Example optical fibers 14a, 14b include material (e.g., a glass core surrounded by a glass cladding layer) that transmits optical information/signals.

As depicted, the optical fibers 14a of the female ferrule 10 may include an end face 24a that is accessible at the contact face 16a at the front end 18a of the female ferrule 10. Also, the optical fibers 14b of the male ferrule 12 may include an end face 24b that is accessible at the contact face 16b at the front end 18b of the male ferrule 12. In use, the example optical fiber end faces 24a, 24b may contact each other to transmit optical signals between the optical fibers 14a, 14b. The female ferrule 10 depicted is a 24-fiber ferrule that has two rows of twelve fibers. It will be appreciated that the female ferrule 10 can be a 12-fiber ferrule that has two rows of six fibers. Although not shown, the male ferrule 12 is also a 24-fiber ferrule and can be configured as a 12-fiber ferrule.

In some implementations, the female ferrule 10 and the male ferrule 12 each may define a pair of alignment pin openings 26a, 26b (see FIG. 1). In some aspects, the alignment pin openings 26a, 26b may extend rearwardly from contact face at the front end 18a, 18b of the female and male ferrules 10, 12. As depicted, the optical fibers 14a, 14b of each female and male ferrule 10, 12 may be positioned between each pair of alignment feature openings 26a, 26b.

In some implementations, the male ferrule 12 may include a pair of alignment pins 28, for example a pair of alignment pins 28 with distal point contacts 30 that can be rounded distal tips, and proximal base end portions 32 positioned and supported within the alignment pin opening 26b. The proximal base end portions 32 may be permanently secured within the alignment pin openings 26b.

Referring to FIG. 3, a side view of the longest axis of the female multi-fiber ferrule 10 is depicted. The optical fibers 14a can be potted within the fiber passages 20a. In one example, the optical fibers 14a are potted within the fiber passages 20a by bonding the optical fibers 14a within the fiber passages 20a using an adhesive such as epoxy. In one example, the adhesive can be used to secure the optical fibers 14a such that the optical fibers 14a are axially fixed in the ferrule. In other examples, the adhesive can have a resilient property that may allow the optical fibers 14a to move slightly. The optical fibers 14a can be potted within the female multi-fiber ferrule 10 with ends 38 (e.g., terminal portions) of the optical fibers 14a projecting distally beyond the contact face 16a of the female multi-fiber ferrule 10.

Turning again to FIG. 2, a laser ablation process can be used to cleave the optical fibers 14a with enough precision to create a final finish of end faces of the optical fibers 14a. In one aspect, a laser beam can be aimed at a first stage position 40 to cleave a first set of optical fibers 42. The first set of optical fibers 42 can include a first row first optical fiber 44 positioned in the first row 46 and a second row first optical fiber 48 positioned in a second row 50. The position of the laser beam can be indexed in a direction 52 to a second stage position 54. The laser can continue laser cleaving a second set of optical fibers 56 in the female multi-fiber ferrule 10. Such a process can continue until all of the optical fibers have been cleaved to a final finish.

Figure 4:
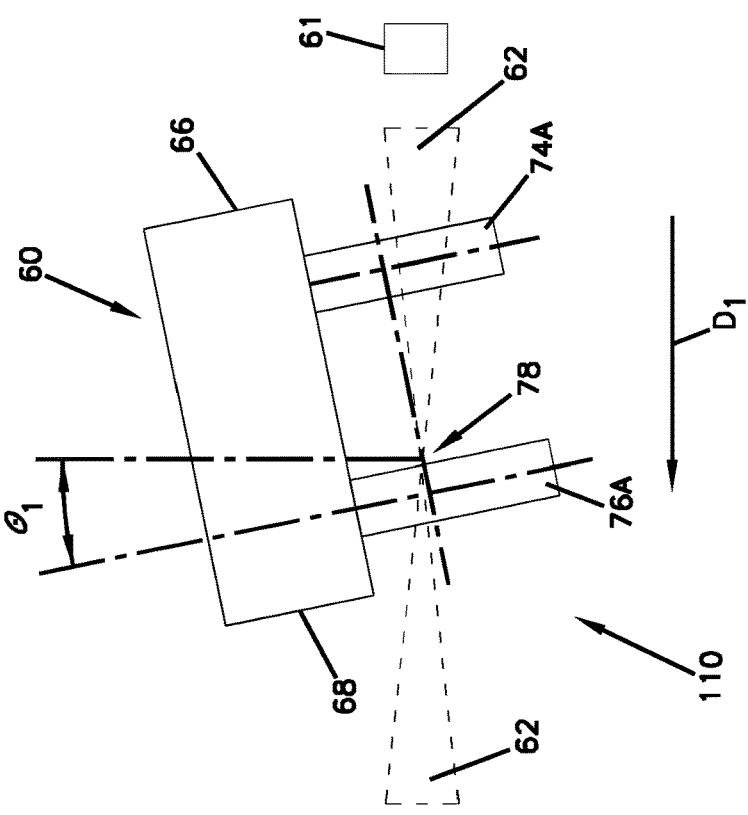
FIG. 4 is a side plan view of an example ferrule exposed to a laser beam source in accordance with the principles of the present disclosure.

FIGS. 4 and 5 illustrate an example multi-fiber ferrule 60 that is exposed to a laser source 61 for cleaving optical fibers in accordance with the principles of the present disclosure.

In one aspect, the multi-fiber ferrule 60 includes opposite first and second major sides 66, 68 that extend between opposite first and second minor sides 70, 72. The optical fibers can be arranged in first and second parallel rows 74, 76 having lengths L that extend along the first and second major sides 66, 68 of the multi-fiber ferrule 60. The first row of optical fibers 74 can be positioned between the first major side 66 of the multi-fiber ferrule 60 and the second row of optical fibers 76. The second row of optical fibers 76 can be positioned between the second major side 68 of the multi-fiber ferrule 60 and the first row of optical fibers 74. Each optical fiber $74_A$-$74_L$ of the first row of optical fibers 74 can be aligned with a corresponding optical fiber $76_A$-$76_L$ of the second row of optical fibers 76.

Turning again to FIG. 4, a schematic diagram illustrating the position of the optical fiber $76_A$, at an angle of incidence $\theta_1$ relative to a path of the laser beam 62 is shown. The laser beam 62 is swept across the surface of the optical fibers $74_A$, $76_A$. The energy from the laser beam 62 is focused on a spot 78 (i.e., focal point) of the farthest optical fiber 76a in the second row 76 rather than the closest optical fiber $74_A$ in the first row 74. The focal point 78 can be near or on the optical fiber $76_A$. The laser beam 62 is angled such that it gradually narrows toward the focal point 78 on optical fiber $76_A$ and then gradually angles outward.

Figure 9:
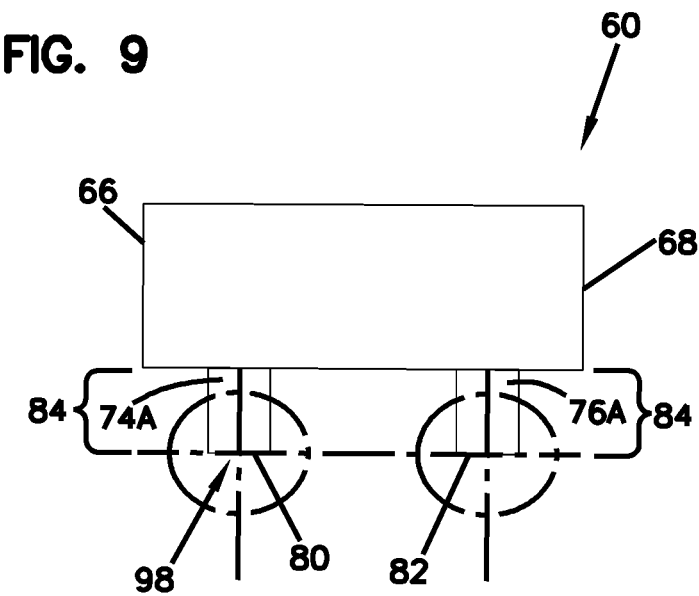
FIG. 9 is a side plan view of the ferrule of FIG. 7.

Laser processing is achieved by imposing an amount of laser energy at a specific laser intensity onto the optical fibers $74_A$, $76_A$. Upon contact with the optical fibers $74_A$, $76_A$, the radiation of an example $CO_2$ laser is absorbed primarily at the outer surface of the optical fibers $74_A$, $76_A$. The silica (i.e., glass) at the surface of the optical fibers $74_A$, $76_A$ is raised above its vaporization temperature and is ablated away while heat is conducted into the material of the optical fibers $74_A$, $76_A$. The longer the laser is aimed at the surface, the greater is the resulting depth penetration of the heat generated by the laser. Therefore, short, intense pulses may be used to cause ablation of the surface cladding with minimal melting of the underlying material. In other aspects, a continuous laser process may be used with less intensity. The laser processing methods disclosed herein permit an operator to produce an end face 80, 82 (SEE FIG. 9) with a final finish. The final end faces are preferably generally perpendicular relative to central axes of the fiber but could also be angled. In certain examples, the end of the fibers can be slightly rounded or domed after laser cutting.

Figure 6:
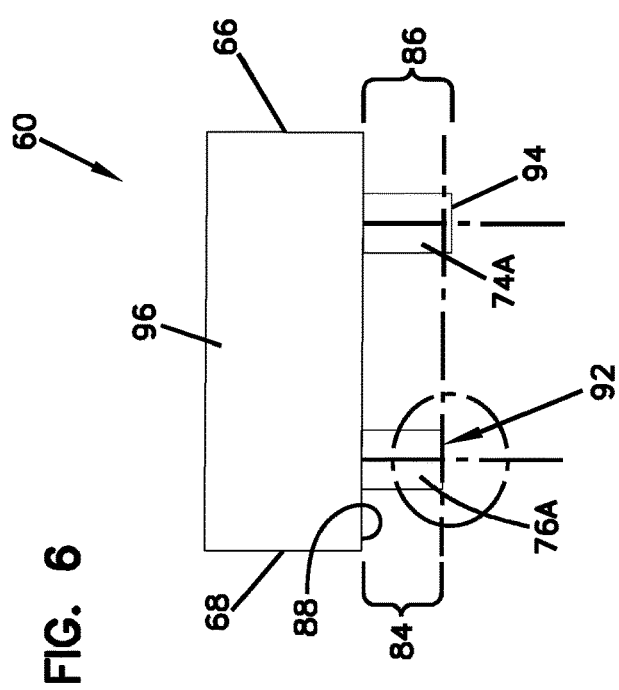
FIG. 6 is a side plan view of the ferrule of FIG. 5.

An exemplary method for processing the respective end faces 80, 82 of the optical fibers $74_A$, $76_A$ includes the step of first laser cutting the first and second rows of optical fibers $74_A$, $76_A$ in a first fiber cutting step (see FIG. 4) by directing the laser beam 62 in a first direction $D_1$ (see FIG. 5) relative to the multi-fiber ferrule 60. The first direction $D_1$ extends from the first major side 66 of the multi-fiber ferrule 60 toward the second major side 68 of the multi-fiber ferrule 60 such that the laser beam 62 cuts the optical fiber $76_A$ of the second row of optical fibers 76 to a first fiber extension length 84 (see FIG. 6) and cuts the optical fibers $74_A$ of the first row of optical fibers 74 to a second fiber extension length 86 (see FIG. 6). The first fiber extension length 84 will be shorter than the second fiber extension length 86 and the first and second fiber extension lengths 84, 86 can be measured from an end face 88 (e.g., reference plane) of the multi-fiber ferrule 60. In certain examples, the first and second fiber extension lengths 84, 86 can be measured with respect to a reference plane of the multi-fiber ferrule.

Figure 7:
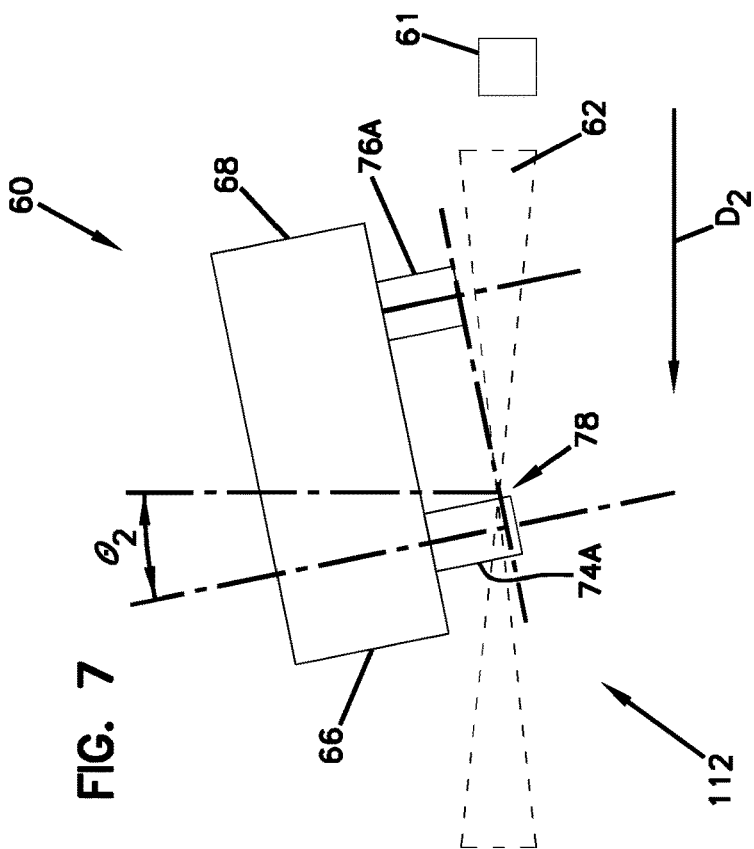
FIG. 7 is a side plan view of the ferrule of FIG. 4 flipped relative to the laser beam source.
Figure 8:
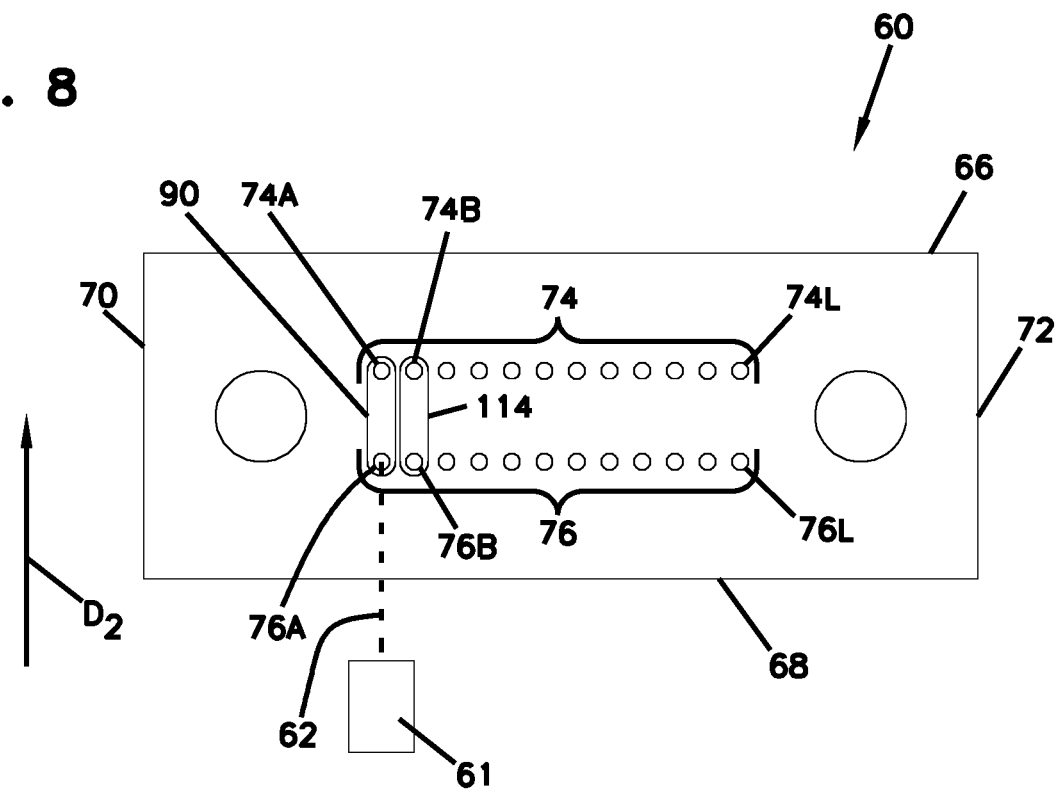
FIG. 8 is an end view of the ferrule of FIG. 7.

The method further includes the step of laser cutting the first row of optical fibers 74 in a second fiber cutting step (see FIG. 7) after the first fiber cutting step (See FIG. 4) by directing the laser beam 62 in a second direction $D_2$ (see FIG. 8) relative to the multi-fiber ferrule 60. In FIG. 7, the position of the optical fiber $74_A$ is shown at an angle of incidence $\theta_2$ relative to a path of the laser beam 62. In one aspect, the multi-fiber ferrule 60 can be flipped over relative to the laser source 61 between the first fiber cutting step and the second fiber cutting step such that the first major side 66 of the multi-fiber ferrule 60 faces toward the laser beam source 61 during the first fiber cutting step, and the second major side 68 of the multi-fiber ferrule 60 faces toward the laser source 61 during the second fiber cutting step.

The second direction $D_2$ extends from the second major side 68 of the multi-fiber ferrule 60 toward the first major side 66 of the multi-fiber ferrule 60 such that the laser beam 62 a) cuts the optical fiber $74_A$ of the first row of optical fibers 74 to the first fiber extension length 84; and b) by-passes the optical fiber $76_A$ of the second row of optical fibers 76 such that the optical fiber $76_A$ of the second row of optical fibers 76 remain at the first fiber extension length 84. The optical fibers $74_A$, $76_A$ both have end faces 80, 82 with final finishes that do not require subsequent polishing. The end faces 80, 82 of the optical fibers $74_A$, $76_A$ are coplanar.

It will be appreciated that while the method depicted in FIGS. 4-9 is described above with respect to optical fibers $74_A$, $76_A$, the same process can be repeated for each of the remaining optical fibers $74_{B-L}$, $76_{B-L}$ positioned in the first and second rows 74, 76. For example, the same operations shown in FIGS. 4-9 can be sequenced through first and second rows 74, 76 to process the remaining optical fibers $74_{B-L}$, $76_{B-L}$.

In an alternative embodiment, another exemplary method for laser processing end faces 80, 82 of the optical fibers $74_A$, $76_A$ is illustrated in a flow chart in FIG. 10. In this example, the method 100 includes operations 102, 104, and 106.

The operation 102 is performed to insert a first set of optical fibers 90 (see FIG. 5) through a first set of openings 20a in each one of first and second rows 74, 76 of the multi-fiber ferrule 60 so that terminal portions 38 (see FIG. 3) of the first set of optical fibers 90 protrude from the front end 18a of the multi-fiber ferrule 60. The first set of optical fibers 90 can include a first row first optical fiber $74_A$ positioned in the first row 74 and a second row first optical fiber $76_A$ positioned in the second row 76.

The operation 104 is performed to cleave the terminal portion 38 of the second row first optical fiber $76_A$ so as to form a second row first optical fiber terminal end 92 (see FIG. 6) with a final finish. The terminal portion 38 of the first row first optical fiber $74_A$ can be cleaved so as to form a remaining segment 94 (see FIG. 6) of the terminal portion 38 of the first row first optical fiber $74_A$ that has a non-final finish.

The operation 106 is performed to cleave the remaining segment 94 of the terminal portion 38 of the first row first optical fiber $74_A$ so as to form a first row first optical fiber terminal end 98 (see FIG. 9) with a final finish. The remaining segment 94 of the terminal portion 38 of the first row first optical fiber $74_A$ can have a second fiber extension length 86 prior to cleaving that is longer than the first fiber extension length 84 of the second row first optical fiber terminal end 92 such that cleaving thereof does not damage the final finish of the second row first optical fiber terminal end 92.

In some aspects, an operation can be performed between the operations 104 and 106 in order to flip a ferrule body 96 of the multi-fiber ferrule 60 from a first position 110 (see FIG. 4) to a second position 112 (see FIG. 7).

In other aspects, the method may include the steps of: 1) inserting a second set of optical fibers 114 (See FIG. 5) through a second set of openings 20a in each one of the first and second rows 74, 76 of the multi-fiber ferrule 60. The second set of optical fibers 114 can include a first row second optical fiber $74_B$ (See FIG. 5) and a second row second optical fiber $76_B$ (See FIG. 5). The laser can be sequenced to align with the second set of optical fibers 114 such that the focal point 78 of the laser 62 focuses on the second row second optical fiber $76_B$.

It will be appreciated that the indexing of the laser source 61 can be repeated to continue along the length L of the first and second row of optical fibers 74, 76 to cleave fibers $74_{C-L}$, $76_{C-L}$ using the same operation as described above with respect to optical fibers $74_{A-B}$, $76_{A-B}$.

From the forgoing detailed description, it will be evident that modifications and variations can be made without departing from the spirit and scope of the disclosure.

What is claimed is:

1. A method for processing optical fibers supported by a multi-fiber ferrule, the multi-fiber ferule including opposite first and second major sides that extend between opposite first and second minor sides, the optical fibers being arranged in first and second parallel rows having lengths that extend along the first and second major sides of the multi-fiber ferrule, the first row of optical fibers being positioned between the first major side of the multi-fiber ferrule and the second row of optical fibers, the second row of optical fibers being positioned between the second major side of the multi-fiber ferrule and the first row of optical fibers, each optical fiber of the first row of optical fibers being aligned with a corresponding optical fiber of the second row of optical fibers, the method comprising:
(a) laser cutting the first and second rows of optical fibers in a first fiber cutting step by directing a laser beam in a first direction relative to the ferrule, the first direction extending from the first major side of the multi-fiber ferrule toward the second major side of the multi-fiber ferrule such that the laser beam cuts the second row of optical fibers to a first fiber extension length and cuts the optical fibers of the first row of optical fibers to a second fiber extension length, the first fiber extension length being shorter than the second fiber extension length; and
(b) laser cutting the first row of optical fibers in a second fiber cutting step after the first fiber cutting step by directing a laser beam in a second direction relative to the multi-fiber ferrule, the second direction extending from the second major side of the multi-fiber ferrule toward the first major side of the multi-fiber ferrule such that the laser beam: a) cuts the optical fibers of the first row of optical fibers to the first fiber extension length; and b) by-passes the optical fibers of the second row of optical fibers such that the optical fibers of the second row of optical fibers remain at the first fiber extension length.

2. The method of claim 1, wherein:
(a) the multi-fiber ferrule is flipped over relative to a laser beam source between the first fiber cutting step and the second fiber cutting step, the first major side of the multi-fiber ferrule facing toward the laser beam source during the first fiber cutting step, and the second major side of the multi-fiber ferrule facing toward the laser beam source during the second fiber cutting step.

3. A method for cleaving a multi-fiber ferrule having multiple rows, the multiple rows including a first row and a second row, the first row being positioned opposite to the second row such that the first and second rows register one above the other in vertical succession, the multi-fiber ferrule including a ferrule body having a front end and a rear end, the ferrule body defining a plurality of openings in each one of the first and second rows of the multi-fiber ferrule, the plurality of openings extending through the ferrule body from the front end to the rear end, the method comprising:
(a) inserting a first set of optical fibers through a first set of openings in each one of the first and second rows of the multi-fiber ferrule so that terminal portions of the first set of optical fibers protrude from the front end of the multi-fiber ferrule, the first set of optical fibers including a first row first optical fiber positioned in the first row and a second row first optical fiber positioned in the second row;
(b) cleaving the terminal portion of the second row first optical fiber so as to form a second row first optical fiber terminal end having a final finish, the length of the terminal portion of the first row first optical fiber being affected so as to form a remaining segment of the terminal portion of the first row first optical fiber; and
(c) cleaving the remaining segment of the terminal portion of the first row first optical fiber so as to form a first row first optical fiber terminal end having a final finish, the remaining segment of the terminal portion of the first row first optical fiber being longer than the second row first optical fiber terminal end such that cleaving thereof does not damage the final finish of the second row first optical fiber terminal end.

4. The method of claim 3, wherein:
(a) the step of cleaving includes a laser ablation process.

5. The method of claim 3, wherein:
(a) the first set of optical fibers are fixed within the first set of openings by an adhesive, the adhesive securing the first set of optical fibers to the ferrule body.

6. The method of claim 3, wherein in performing step (b),
(a) the second row first optical fiber is positioned at an angle of incidence relative to a laser, a focal point of the laser focusing on the terminal portion of the second row first optical fiber.

7. The method of claim 6, wherein:
(a) the second row is the farthest row in the multi-fiber ferrule relative to the focal point of the laser.

8. The method of claim 3, wherein in performing step (c),
(a) the first row first optical fiber is positioned at an angle of incidence relative to a laser, the focal point of the laser focusing on the remaining segment of the terminal portion of the first row first optical fiber.

9. The method of claim 8, wherein:
(a) the ferrule body of the multi-fiber ferrule is flipped about 180 degrees such that the first row is the farthest row in the multi-fiber ferrule relative to the focal point of the laser.

10. The method of claim 3, wherein:
(a) the second row first optical fiber terminal end and the first row first optical terminal end have equal lengths with respect to a ferrule reference surface.

11. The method of claim 3, wherein in performing step (c):
(a) the remaining segment of the terminal portion of the first row first optical fiber is cleaved resulting in a non-final finish.

12. The method of claim 6, further comprising the step of:
(a) inserting a second set of optical fibers through a second set of openings in each one of the first and second rows of the multi-fiber ferrule.

13. The method of claim 12, wherein:
(a) the second set of optical fibers include a first row second optical fiber and a second row second optical fiber.

14. The method of claim 13, wherein:
(a) the laser is sequenced to align with the second set of optical fibers such that the focal point of the laser focuses on the second row second optical fiber.

15. The method of claim 14, further comprising the step of:
(a) cleaving the second row second optical fiber to form a final finish end face during a first process while cleaving the first row second optical fiber to a non-final finish end face.

16. The method of claim 15, further comprising the step of:
(a) focusing the focal point of the laser towards on the first row second optical fiber.

17. The method of claim 16, further comprising the step of:
(a) cleaving the first row second optical fiber to form a final finish end face during a second process without further processing the second row second optical fiber.

18. The method of claim 17, wherein:
(a) the first row second optical fiber has a length longer than the second row second optical fiber such that the second row second optical fiber is not exposed to the second process of cleaving of the first row second optical fiber.

19. The method of claim 3, wherein:
(a) the multi-fiber ferrule is flipped over relative to a laser beam source between the cleaving of the terminal portion of the second row first optical fiber and the cleaving of the remaining segment of the terminal portion of the first row first optical fiber.

20. A method for cleaving a multi-fiber ferrule having multiple rows, the multiple rows including a first row and a second row, the first row being positioned opposite to the second row such that the first and second rows register one above the other in vertical succession, the multi-fiber ferrule including a ferrule body having a front end and a rear end, the ferrule body defining a plurality of openings in each one of the first and second rows of the multi-fiber ferrule, the plurality of openings extending through the ferrule body from the front end to the rear end, the method comprising:
(a) inserting first and second sets of optical fibers through respective first and second sets of openings in each one of the first and second rows of the multi-fiber ferrule so that terminal portions of the first and second sets of optical fibers protrude from the front end of the multi-fiber ferrule, the first set of optical fibers including a first row first optical fiber and a second row first optical fiber, the second set of optical fibers including a first row second optical fiber and a second row second optical fiber;
(b) cleaving the terminal portion of the second row first optical fiber so as to form a second row first optical fiber terminal end having a final finish, the length of the terminal portion of the first row first optical fiber being affected so as to form a remaining segment of the terminal portion of the first row first optical fiber;
(c) indexing to the second row second optical fiber so as to cleave the terminal portion of the second row second optical fiber to form a second row second optical fiber terminal end having a final finish, the terminal portion of the first row second optical fiber being affected so as to form a remaining segment of the terminal portion of the first row second optical fiber;
(d) cleaving the remaining segment of the terminal portion of the first row first optical fiber so as to form a first row first optical fiber terminal end having a final finish, the remaining segment of the terminal portion of the first row first optical fiber being longer than the second row first optical fiber terminal end such that cleaving thereof does not damage the final finish of the second row first optical fiber terminal end; and
(e) indexing to the first row second optical fiber to cleave the remaining segment of the terminal portion of the first row second optical fiber to form a first row second optical fiber terminal end having a final finish, the remaining segment of the terminal portion of the first row second optical fiber being longer than the second row second optical fiber terminal end such that cleaving thereof does not damage the final finish of the second row second optical fiber terminal end.

21. The method of claim 20, wherein:
(a) the step of cleaving includes a laser ablation process.

22. The method of claim 20, wherein in performing step (b):
(a) the second row first optical fiber is positioned at an angle of incidence relative to a laser, a focal point of the laser focusing on the terminal portion of the second row first optical fiber.

23. The method of claim 22, wherein:
(a) the second row is the farthest row in the multi-fiber ferrule relative to the focal point of the laser.

* * * * *